INVENTORS
RAYMOND L. STEINBERGER
CHARLES L. DARNER

ATTORNEY

United States Patent Office 3,144,632
Patented Aug. 11, 1964

3,144,632
SONAR WAKE DETECTOR
Raymond L. Steinberger, Alexandria, Va., and
Charles L. Darner, Orlando, Fla.
Filed Dec. 17, 1948, Ser. No. 65,956
1 Claim. (Cl. 340—5)
(Granted under Title 35, U.S. Code (1952), sec. 266)

The present invention relates in general to underwater detection and in particular to an electro-sonic wake detecting method and apparatus.

It has been discovered that turbulence in a fluid especially water, will produce in an electro-sonic transducer, fluctuations in electrical properties such as the motional admittance, that such a turbulence may persist for a considerable period of time after removal of the disturbing force, and that although such disturbance decays more or less exponentially, it will persist, in detectable magnitude, for a matter of hours where the disturbing force is large.

An object of the invention is to provide a method of and apparatus for detecting the presence and recording the form of a turbulence or wake in a body of water at either an early or a substantially advanced age of the wake, whereby to detect the past occurrence of the passage of an object through the water.

Another object is to accomplish such detection with the use of an electro-sonic projector and with a minimum radiation of energy.

Various other objects and advantages of the invention will become apparent from a perusual of the following specification and the accompanying drawings in which.

The above objects in general are attained through the use of an electrical bridge circuit fed from a source of alternating current at supersonic frequency arranged so that balancing of the bridge depends upon the electrical properties of a supersonic electro-compressional wave transducer or what may be termed a supersonic, electrosonic transducer, having its electrical energizing circuit included in an arm of the bridge. The transducer is operated in direct contact with the fluid in which the turbulence such as a wake is to be detected.

The off-null indicating circuit of the bridge is connected through a suitable amplifier to a recording indicator and to an audible indicator, the latter utilizing an ultrasonic heterodyning oscillator to render the off-null indicating current variations audible.

It will be understood that the indicating device may be a meter, headphones, or other voltage or current measuring device.

Figure 1:
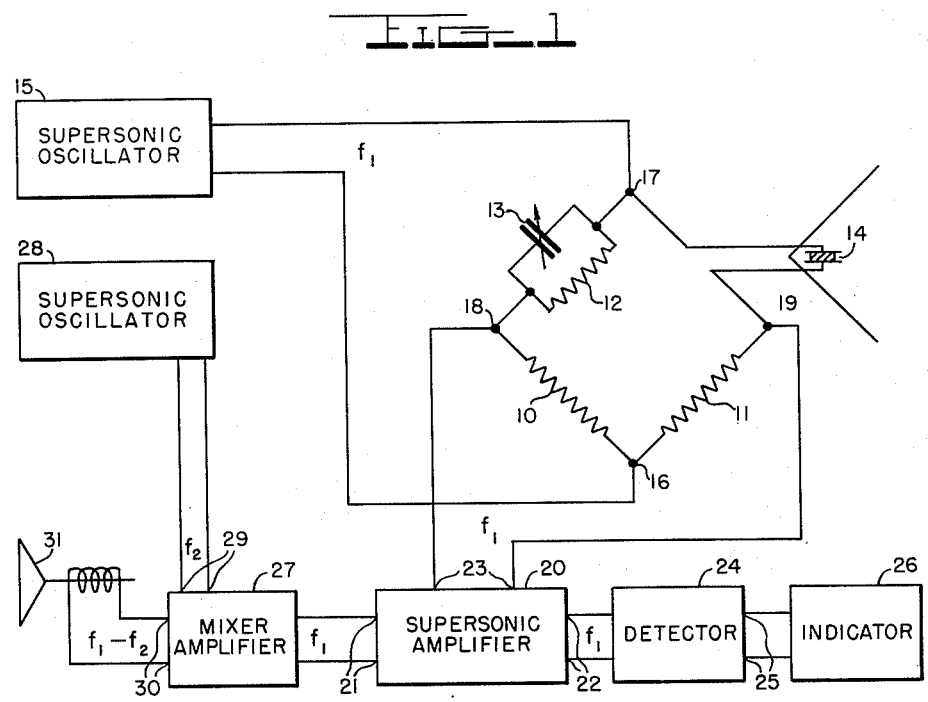
FIG. 1 is a schematic diagram of the fluid-turbulence detecting system.

For a more detailed disclosure of the invention attention is directed to FIG. 1, showing the apparatus components and circuit connections of a preferred embodiment of the wake detector. Here is shown an arrangement for bridge-balancing a piezo-electric electro-sonic transducer according to the Wien bridge balance method, the Wien-type bridge consisting of two resistance arms 10 and 11, a resistance-capacitance arm having resistance 12 and variable capacitance 13 in parallel, and a second resistance-capacitance arm consisting of the piezo-electric crystal, ultra-sonic electro-sonic transducer 14, known as a piezo-electric ultra-sonic projector. It will be understood that in place of the piezo-electric transducer 14, any known or other suitable type of electro-sonic transducer may be used, for example a magnetostriction transducer. The bridge is energized by a low-power ultrasonic oscillator 15 of frequency $f_1$, to excite the projector at its resonant frequency $f_1$. In a successfully operated embodiment of the invention, the transducer used was a Rochelle salts, piezo electric crystal transducer having a transmitting-receiving face or coupling surface of about 14 inches diameter. The exciting frequency was of the order 25 kilocycles. However these values may be departed from widely without substantial detriment to sensitivity of detection. The input terminals 16 and 17 of the bridge are composed respectively of the junction of the resistance arms 10 and 11 and the junction of the arm containing the projector with the arm containing the resistance-capacity network 12-13. The output terminals 18-19 for the detecting or off-null indicating circuit are connected to an ultra-sonic amplifier 20 through the amplifier input terminals 23. Two pairs of output terminals 21 and 22 feed the amplified off-null signals or current variations to an audio indicating system and a recording system respectively. Signal currents from the output terminals 22, carried as modulations on the carrier frequency $f_1$ are detected by the detector 24 and fed from the detector output terminals 25 to the recording indicator 26 of any known or other suitable type.

For audible detection, the output terminals 21 of the ultra-sonic amplifier 20 are connected to a mixer amplifier 27, connected to receive heterodyning current from a heterodyne ultra-sonic oscillator 28 of frequency $f_2$ through input terminals 29. The beat output of frequency $f_1-f_2$ from output terminals 30 of the mixer is fed to a suitable loud speaker 31.

In operation, the projector element 14 submerged in non-turbulent water and energized to project acoustic wave energy into the water immediately surrounding it, at its natural frequency $f_1$ by application of the energizing current of frequency $f_1$ to the input terminals 16-17 of the Wien bridge, is balanced by the variable capacity 13 and resistance 12, to give substantially zero output at the terminals 18-19. Thus when the projector is used as a probe for wake detection the output current is representative of or proportional to variations in the total admittance of the transducer. This total admittance includes the electrical or blocked admittance and the motional admittance, which latter is related to the degree of movement of the movable element of the transducer which imparts mechanical energy to or receives mechanical energy from the surrounding water. Thus the turbulence in the wake produces variations in the total admittance of the transducer which in turn produces a variable unbalance of the bridge and a bridge output current of $f_1$ frequency which is amplitude modulated with such variations. Because distance to any reflecting object varies continuously with ship's movement necessary to a probing of the body of water for wake detection, bridge balance as the result of a standing wave system will not occur. The amplified, bridge, off-null signal, for undisturbed water, as fed to the recorder is kept below the threshold of the recorder so that a record is inscribed only when the bridge attains such unbalance as is produced by a wake. It has been found that usually only a few microwatts are required for satisfactory operation.

Audible indication of the amplified off-null signal currents is obtained at the loud speaker 31 by heterodyne reception through the mixer 27 which beats the ultrasonic, signal carrier of frequency $f_1$ with the current of frequency $f_2$ from the oscillator 28. The frequency $f_2$ preferably is chosen to give a readily perceptible audio beat note in the loud speaker 31. Here again the sound output of the speaker is kept below an audible level when the bridge is substantially balanced so as to act as an alarm by producing a warning tone only upon detection of a wake.

Figure 2:
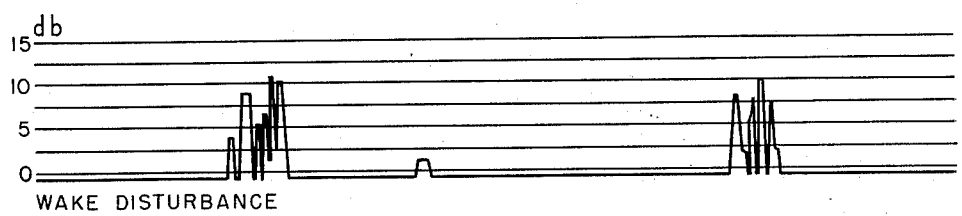
FIG. 2 is a wake recorder tracing.

The recorder tracing of FIG. 2 is a record of an actual ship's wake and illustrates the nature of wake disturbance, the record pattern shown being that portion obtained by a single passage of the probe across the wake. The record pattern of FIG. 2 showing two rather distinct zones of disturbance in the path of the probe is characteristic of a wake, the spaced zones of disturbance representing sections of the two arms of the wake. The appearance of such records varies for different types of ships, thus serving to identify the general type of ship producing the wake. With this apparatus, wakes may be detected long after passage of a ship.

While one specific embodiment of the invention has been herein shown and described, it is to be understood that the invention is not limited to such specific embodiment but contemplates all such modifications and variants thereof as fall fairly within the scope of the appended claim.

The invention described herein may be manufactured and used by or for the Government of the United States States of America for governmental purposes without the payment of any royalties thereon or therefor.

What is claimed is:

Apparatus for detecting and recording the characteristics of a wake in a body of water comprising an electrosonic transducer immersed in the body of water, a Wien bridge having a pair of input terminals and a pair of output terminals, said transducer being connected in one arm of the bridge, a network in the adjacent arm of the bridge consisting of a resistance shunted by a variable condenser, said network balancing the electrical characteristics of the transducer to produce a null at the output terminals of the bridge, a source of alternating current connected to the input terminals of the bridge, an electrical indicating means, an electrical recording means, and an alternating current amplifier connecting the output terminals of the bridge to said indicating and recording means, whereby the indicating means will operate to give immediate indication of the presence of a wake while a record will be made depicting the nature of the wake.

References Cited in the file of this patent

UNITED STATES PATENTS

| | | |
|---|---|---|
| 2,009,459 | Turner | July 30, 1935 |
| 2,190,686 | Slichter | Feb. 20, 1940 |
| 2,244,484 | Beers | June 3, 1941 |
| 2,424,030 | Hayes | July 15, 1947 |
| 2,460,316 | Trent | Feb. 1, 1949 |

FOREIGN PATENTS

| | | |
|---|---|---|
| 427,769 | Germany | Apr. 16, 1926 |
| 1,708,938 | Germany | Apr. 16, 1929 |
| 2,031,951 | Germany | Feb. 25, 1936 |